Patented Sept. 12, 1950

2,522,276

UNITED STATES PATENT OFFICE 2,522,276

METHODS OF DRYING FOODS

Edward K. Ketcham, Yakima, Charles F. May, Selah, and Edgar E. Jagow, Yakima, Wash., assignors, by mesne assignments, to Vacu-Dry Company, Oakland, Calif., a corporation of California No Drawing. Application August 28, 1945, Serial No. 613,220

6 Claims. (Cl. 99—204)

This invention relates to a method of drying or dehydrating fruits, vegetables or other food products. More particularly, this invention relates to the control and determination of the particle or piece size of a dried product of such character.

As an illustration but not as a limitation, the invention will be described in connection with the processing of apples. Heretofore in the drying or dehydrating of apples, processes have been employed which generally follow the disclosures of United States Letters Patents numbered 2,110,170; 2,023,536; 2,110,184; 2,110,821; 2,118,324; and 2,134,147.

Where apples have been reduced to a substantially dry state, such as containing not more than three per cent (3%) moisture, it has been the practice to further dry or to employ as the starting product, partially dried apples or apples containing 20 to 30% moisture. Such product was first divided and then spread substantially uniform on trays. These trays containing such products were disposed in sealed dryers and subjected to heated vapors under pressure. Then the heated vapors were released and a vacuum was rapidly drawn and the balance of the drying was accomplished with appropriate application of heat with negative pressures or substantially vacuum conditions present. When no further drying was desired, the product was cooled without increasing the pressure. The sudden release of the heated vapors and the rapid drawing of a vacuum caused a rupturing of the fiber structure of the apple product, a substantial increase in the size of the product, and an increased rate of drying.

A difficulty encountered in the prior art was that the particle or piece size of the apples was not predictable. Vegetable and fruit products are nonuniform because of the varying species, varying conditions of soil, air and moisture during growth, varying states of development or ripeness, and other factors. Thus the puffing or expansion, which took place on sudden release of the heated vapor and the rapid drawing of a vacuum, resulted in nonuniform particle size and the product did not lend itself to normal packaging of uniform weights and/or resulted in uneconomical sizes of packages.

It was heretofore thought that uncontrolled puffing and thereafter cooling under vacuum conditions were desirable for rapid reconstituting of the product upon the addition of water when the product was used. We have discovered that after the product has been puffed all of the benefits of rapid drying and rapid reconstituting will obtain even though the product is compressed or the particles or pieces are collapsed before cooling. We have also discovered a process which includes cooling under pressures above those necessary for vacuum drying and puffing so that the dried product will rapidly become set or crystalline-like.

By way of example of our invention, the apple product is reduced to a finely divided form and is uniformly spread on suitable trays. These trays are placed in vacuum drying chambers and therein sealed but no vacuum is drawn. Then the material is subjected to heated vapor under pressure. The temperature employed will be determined by many factors. For example, if the temperature is too low, the process will be proportionately slower and if too high, the product will be charred, caramelized, etc. Also the amount of heat needed will depend upon the species of the fruit or vegetable, development of sugars, ripeness, conditions of soil and air during growth, etc. Generally for a product such as apples, pipes may be disposed under each tray and a fluid circulated therein having a temperature of approximately 250° to 330° F. The heat is applied for about 15 to 30 minutes until a pressure of 5 to 20 pounds per square inch is obtained.

For an example of a shelf type dryer which may be used in this invention note U. S. Letters Patent No. 2,134,147 wherein James C. Rea is the inventor. As moisture evaporates from the product being treated, it enters the ambient gases as vapor and provides the pressure. Next the pressure in the chambers is suddenly released to the atmosphere through an appropriate blow-off valve and a vacuum is drawn as rapidly as possible. The vacuum preferably exceeds 28½ inches of mercury. At this stage the product has been puffed which provides for enhanced drying and promotes more rapid reconstitution when the product is used.

Preferably the temperature in the vacuum chamber is allowed to steadily drop during drying. The drying time will vary with various products and with specimens thereof but generally one to three hours are employed.

It is to be observed that the practice of the present invention eliminates the necessity of cooling the finished dehydrated product in the vacuum chamber and the compulsion of using this apparatus as a cooler. The waste of both the time and the energy required to cool the chamber as well as the product are eliminated by following the teachings of the present invention with consequent increased production in the range of 10% to 40%.

The character of the product at the end of the drying period is most important in our invention. It is very dry (contains approximately less than 3% moisture), is very tacky and sticky, and has a distinct tendency to take on moisture from the air. This tendency is so pronounced that it was heretofore thought necessary to cool the product to a firm and crystalline-like structure before it was safe to remove the material from vacuum conditions. It had been found that if the material was removed from the vacuum apparatus before cooling and even exposed to air conditioned rooms having a temperature of 65° to 80° F. and a relative humidity of 20%, that the product removed moisture from the air and much of the same as commercially handled became soggy and was ruined.

We have found that if the vacuum is suddenly released and the pressure suddenly increased, that the pressure alters the particle or piece size so the same may be controlled and the pieces or particles compressed or collapsed. The range of pressure increase may be from 1 atmosphere to 3 or even greater depending on the desired extent of collapse or compression. If greater than one atmosphere is employed, then more uniform particle size obtains as the resistance to collapse will not vary proportionately as much as the pressure. An important discovery of our invention is that we can collapse the particle size after drying and yet we do not substantially vary the reconstituting characteristics of the final product.

After the product has been subjected to a sudden increase in pressure, it is then subjected to refrigerated air in motion. The product is cooled to a temperature above the dew-point temperature of the ambient air in the packing room so as not to function as a condensor and below the temperature at which it assumes a crystalline-like form. If for example the packing room has a temperature of 65° to 80° F. and a relative humidity of 20%, temperatures of the trays and the product may be reduced to within the range of 45° to 60° F. and the cooling is preferably accomplished in a period of 5 to 30 minutes. Temperatures of the product and the packing room and the moisture present will vary and the above is to be construed as an example and not a limitation of our invention. This rapid cooling causes the product to take on a crystalline-like appearance and the product may be handled and packaged in normal commercial manner without danger of spoilage by becoming soggy and wet.

In our invention we can collapse or reduce the particle size of the product by a sudden increase in pressure and can set or crystallize the particles at such size by the sudden application of a cooling medium and this even at atmospheric pressure. Thus we are able to increase the production of the vacuum equipment, produce a product having both smaller and more uniform particle size, and a product wherein the re-constituting characteristics are unimpaired. Other more specific advantages of the invention have been detailed in this specification or the appended claims.

We claim:

1. In the process of dehydrating fruits and vegetables wherein the moisture content of the particles is reduced to a maximum of 3% in a sealed vessel with the final drying being accomplished under vacuum of the order of 28½ inches of mercury and with controlled heat, at the conclusion thereof the steps of suddenly restoring atmospheric pressure within the sealed vessel, and thereafter rapidly establishing a pressure within said vessel of at least one atmosphere to collapse the particles.

2. In the process of dehydrating fruits and vegetables wherein the moisture content of the particles is reduced to a maximum of 3% in a vacuum chamber with the final drying being accomplished under vacuum in excess of 28½ inches of mercury and with controlled heat, at the conclusion thereof and before removal of the particles the steps of suddenly restoring atmospheric pressure within the vacuum chamber and thereafter rapidly establishing a pressure within said vacuum chamber of from 1 to 3 atmospheres to collapse and compress the particles.

3. The method of controlling finished particle size in the process of dehydrating fruits and vegetables wherein the moisture content of the particles is reduced to a maximum of 3% in a sealed vessel with the final drying being accomplished under vacuum of the order of 28½ inches of mercury and with controlled heat, at the conclusion thereof the steps of suddenly restoring atmospheric pressure within the sealed vessel, thereafter rapidly establishing a pressure within said vessel of at least one atmosphere to collapse the particles, removing the particles from the sealed vessel and cooling to crystalline-like form under controlled conditions of temperature and humidity.

4. The method of controlling finished particle size in the process of dehydrating fruits and vegetables wherein the moisture content of the particles is reduced to a maximum of 3% in a vacuum chamber with the final drying being accomplished under vacuum in excess of 28½ inches of mercury under gradually reduced heat of from 45° to 60° F. at the conclusion thereof the steps of suddenly restoring atmospheric pressure within the sealed vessel, thereafter rapidly establishing pressure of 1 to 3 atmospheres within said vessel to collapse and compress the particles, removing the particles from the sealed vessel and cooling the particles in the usual manner under controlled conditions of temperature and humidity.

5. In the method of vacuum dehydration of fruits and vegetables to a maximum moisture content of 3% wherein the pieces are first puffed and then processed in a sealed chamber and after the dehydration is completed the steps of immediately establishing a positive pressure of from 1 to 3 atmospheres within the vessel before the pieces are removed therefrom to compress and collapse said pieces before cooling, and cooling said pieces after removal.

6. In the method of vacuum dehydration of fruits and vegetables to a maximum moisture content of 3% wherein the pieces are first puffed and then processed in a sealed vacuum chamber and after the dehydration is completed the steps of immediately establishing a positive pressure within the vacuum chamber greater than one atmosphere before the pieces are removed in order to compress and collapse the said pieces, immediately thereafter establishing atmospheric pressure and removing said pieces from said chamber, and cooling said pieces in the conventional manner under controlled conditions of temperature and humidity.

EDWARD K. KETCHAM.
CHARLES F. MAY.
EDGAR E. JAGOW.

REFERENCES CITED

The following references are of record in the file of this patent:

UNITED STATES PATENTS

| Number | Name | Date |
|---|---|---|
| 1,035,839 | Anderson | Aug. 20, 1912 |
| 2,023,536 | Moore | Dec. 10, 1935 |
| 2,110,170 | Percy | Mar. 8, 1938 |
| 2,110,184 | Webb | Mar. 8, 1938 |
| 2,329,600 | Freund | Sept. 14, 1943 |

FOREIGN PATENTS

| Number | Country | Date |
|---|---|---|
| 449,539 | Great Britain | Jan. 25, 1939 |